Figure 1:
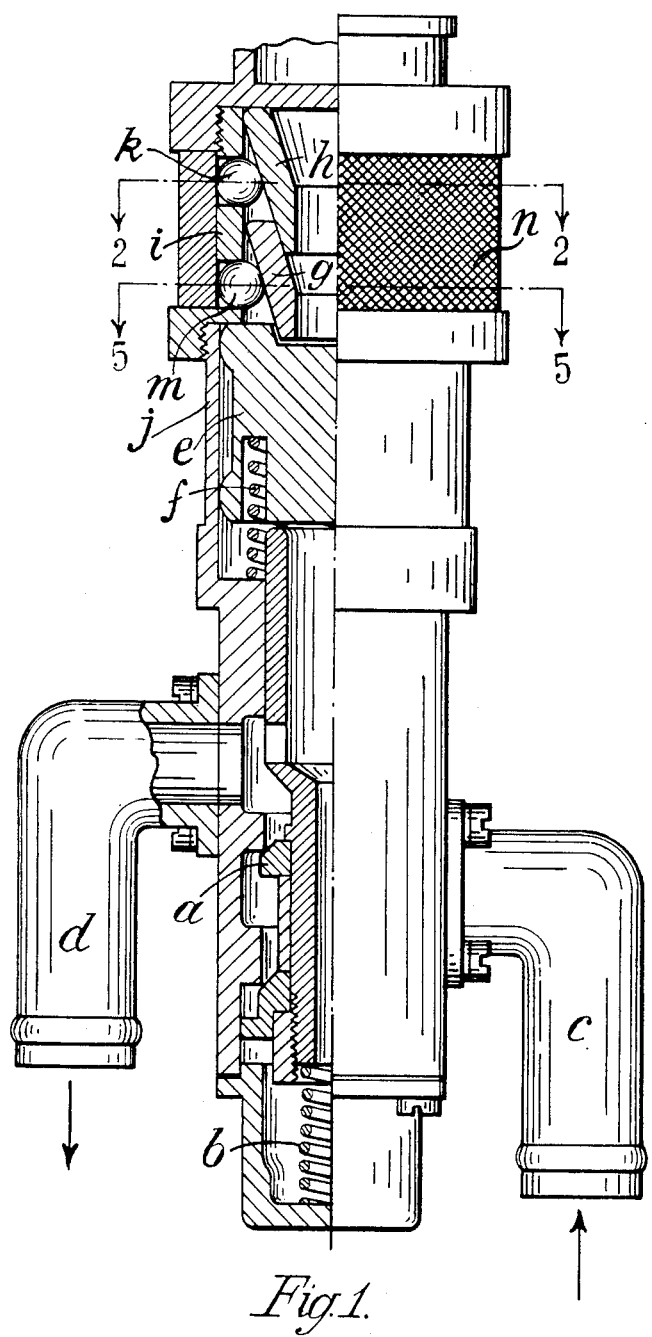

Inventor
G. V. Bloomfield
By Mason Downing Rebold
Attys.

Patented Dec. 9, 1952

2,620,813

UNITED STATES PATENT OFFICE 2,620,813

SELECTOR MECHANISM

George Vincent Bloomfield, Redditch, England, assignor to The Chloride Electrical Storage Company Limited, Clifton Junction, near Manchester, England, a British company Application February 26, 1952, Serial No. 273,520
In Great Britain December 22, 1950

3 Claims. (Cl. 137—38)

This invention relates to a selector mechanism which is particularly suitable for transforming a rotary movement into an axial linear movement where the distance moved and the forces opposing the motion are small. Such mechanisms are useful in devices designed to be adjustable in service so that they may be operated over a wide range or adapted to suit particular requirements, as it is often found that hand adjustment can best be made by a rotary motion, while the device itself requires a linear movement to bring about the desired adjustment.

The invention consists in a selector mechanism for controlling weights which can load a valve comprising a ring form cage with at least one row of ball locating holes therethrough, balls in said holes of greater diameter than the radial thickness of said cage, a weight within the cage having a conical external surface with which a row of balls engages, a cam ring around the cage having at least one row of recesses in its inner face of sufficient depth to allow a row of balls to enter to such an extent that they do not project into the interior of the cage, so that turning of the cam ring can cause the balls to project from the cage and raise the weight therein or allow the balls to move into the cage and allow the weight to descend.

The invention further comprises a ring form cage having two rows of ball locating holes therein, with balls in said holes of greater diameter than the radial thickness of said cage, two weights within the cage one above the other, each weight having a conical external surface, with which a row of balls can engage, a cam ring around the cage having two rows of recesses in its inner face of sufficient depth to allow the two rows of balls to enter to such an extent that they do not project into the interior of the cage, the recesses in the two rows being of different circumferential length so that in one position of the cam ring, both rows of balls project from the cage and raise the two weights, in a second position, one row of balls only project from the cage and raises one weight and in a third position, neither row of balls projects from the cage and both weights are free to descend.

The invention further comprises a valve having its stem loaded by a spring supported weight when the force of gravity can overcome the spring, two weights with conical external surfaces one or both of which being adapted when selectively released to load said spring supported weight, a ring form cage having two rows of ball locating holes therein with balls in said holes of greater diameter than the radial thickness of said cage, the two weights with conical external surfaces being within said cage and adapted to be engaged each by one row of balls, a cam ring around the cage having two rows of recesses in its inner face of sufficient depth to allow the two rows of balls to enter to such an extent that they do not project into the interior of the cage, the recesses in the two rows being of different circumferential length so that in one position of the cam ring, both rows of balls project from the cage and raise the two weights, in a second position, one row of balls only project from the cage and raises one weight, and in a third position neither row of balls projects from the cage and both weights are free to descend and add their weight to the spring supported weight.

Referring to the accompanying drawing:

Figure 1 is a vertical section of a valve incorporating the improved selector mechanism to alter the mass controlling the opening movements of the valve.

Figure 2:
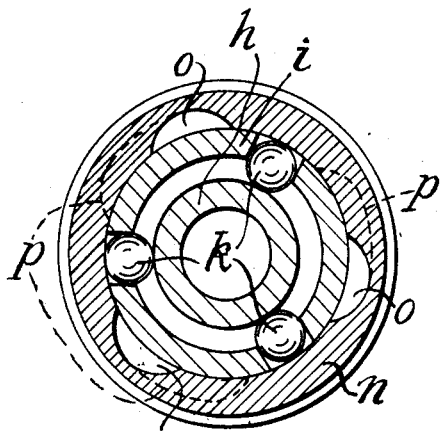
Figure 3:
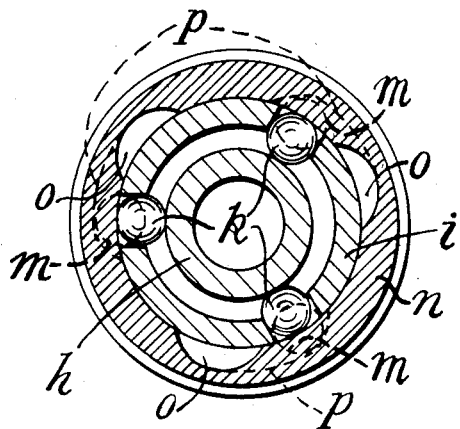
Figure 4:
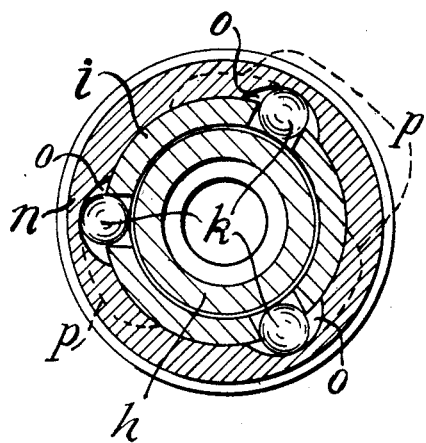

Figures 2—4 are sections on the line 2—2 of Figure 1 in different positions of the cam ring.

Figure 5:
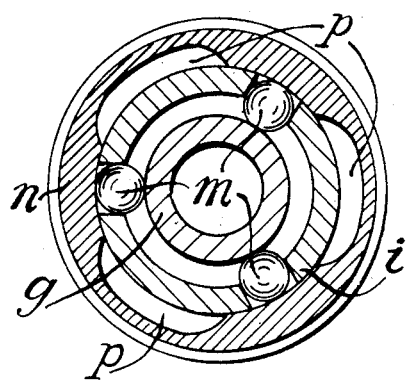

Figure 5 is a section on the line 5—5 of Figure 1.

The valve illustrated in Figure 1 is of the type used to control the flow of air from a suitable source to an aircraft pilot's flying suit. The latter is provided with inflatable bags placed so as to restrict the flow of blood in the pilot from the head to the extremities, thus obviating "blackout" in high speed manoeuvres during which high rates of acceleration prevail. Such flow is varied by means of a mass controlled valve, known as an anti-G valve, which is sensitive to accelerating forces applied along the axis of the valve. In order to vary the characteristics of the valve, it is necessary to alter the mass operating on the valve.

In Figure 1, the valve $a$ is shown as of the double beat type and it is held on its seat by a spring $b$. The air inlet and outlet branches are at $c$ and $d$. There is a spring supported weight at $e$ which only loads the valve $a$ when the force of gravity is operative, due to the rapid acceleration of the pilot in his aircraft, to overcome the spring $f$.

The weight $e$ can have the weight of the conical ring $g$ or of the two conical rings $g$ and $h$ added thereto at the option of the pilot in order to impose an additional load on the valve $a$ tending to open it. The angle of the external cones of the rings $g$ and $h$ is such that when the balls are pressed inwards by the cam ring, the rings are lifted by the balls.

There is a cage $i$ fixed to a casing $j$ for the valve $a$, such cage having two rows each of three holes, with balls $k$ movable in the holes of the upper row and balls $m$ movable in the holes of the lower row. The diameter of the balls is greater than the thickness of the cage $i$. Around the cage $i$ and rotatable with respect thereto is a cam ring $n$, which has three recesses $o$ adapted to register with the upper row of holes and balls $k$ in the cage $i$ and three longer recesses $p$ adapted to register with the lower row of holes and balls $m$ in the cage $i$.

In the position shown in Figures 1, 2 and 5, the recesses $o$ and $p$ of the cam ring $n$ do not register with the two rows of holes and balls in the cage, and the balls $k$ and $m$ project into the space inside the cage and hold the rings $g$ and $h$ clear of the weight $e$ so that their weight is not added to that applied to the valve $a$.

In the position shown in Figure 3, the cam ring $n$ has been turned with respect to the cage $i$ so that the longer recesses $p$ register with the lower row of holes and the balls $m$ and thus the balls $m$ can move into the recesses $p$, thereby allowing the ring $g$ to move downwards and add its weight to that of the weight $e$.

In Figure 4 the cam ring $i$ has been turned further so that the recesses $o$ register with the upper row of holes and the balls $k$ in th cage $i$, the long recesses $p$ still being in register with the lower holes and the balls $m$ therein. This permits the balls $k$ to move into the recesses $o$ thereby releasing the ring $h$ and allowing its weight also to be added to the weight of the ring $g$ and applied to the weight $e$.

When the cam ring $i$ is turned back to the position shown in Figures 1, 2 and 5 the balls $k$ and $m$ are forced inwards and the rings $g$ and $h$ are raised one after the other so that they are brought clear of the weight $e$.

Whilst we have shown one cam ring and two rows of balls for controlling two weight rings $g$ and $h$, we may of course use more than one cam ring and more than two weight rings.

With our improvement, a pilot can readily control the pressure in his flying suit by turning the cam ring $n$ in one or other direction to an extent sufficient to bring one or both rings $g$ and $h$ into or out of service.

What I claim is:

1. A selector mechanism for controlling weights which can load a valve comprising a ring form cage with at least one row of ball locating holes therethrough, balls in said holes of greater diameter than the radial thickness of said cage, a weight within the cage having a conical external surface with which a row of balls engages, a cam ring around the cage having at least one row of recesses in its inner face of sufficient depth to allow a row of balls to enter to such an extent that they do not project into the interior of the cage, so that turning of the cam ring can cause the balls to project from the cage and raise the weight therein or allow the balls to move into the cage and allow the weight to descend.

2. A selector mechanism as claimed in claim 1 comprising a ring form cage having two rows of ball locating holes therein, with balls in said holes of greater diameter than the radial thickness of said cage, two weights within the cage one above the other, each weight having a conical external surface, with which a row of balls can engage, a cam ring around the cage having two rows of recesses in its inner face of sufficient depth to allow the two rows of balls to enter to such an extent that they do not project into the interior of the cage, the recesses in the two rows being of different circumferential length so that in one position of the cam ring, both rows of balls project from the cage and raise the two weights, in a second position, one row of balls only project from the cage and raises one weight and in a third position, neither row of balls projects from the cage and both weights are free to descend.

3. A selector mechanism for controlling weights which can load a valve, comprising a valve, a spring supported weight adapted to load said valve when the force of gravity can overcome its spring, two weights with conical external surfaces one or both of which being adapted when selectively released to load said spring supported weight, a ring form cage having two rows of ball locating holes therein with balls in said holes of greater diameter than the radial thickness of said cage, the two weights with conical external surfaces being within said cage and adapted to be engaged each by one row of balls, a cam ring around the cage having two rows of recesses in its inner face of sufficient depth to allow the two rows of balls to enter to such an extent that they do not project into the interior of the cage, the recesses in the two rows being of different circumferential lengths so that in one position of the cam ring, both rows of balls project from the cage and raise the two weights, in a second position, one row of balls only projects from the cage and raises one weight, and in a third position neither row of balls project from the cage and both weights are free to descend and add their weight to the spring supported weight.

GEORGE VINCENT BLOOMFIELD.

REFERENCES CITED

The following references are of record in the file of this patent:

FOREIGN PATENTS

| Number | Country | Date |
|--------|---------|------|
| 511,417 | Germany | Oct. 30, 1930 |
| 604,304 | Great Britain | July 1, 1948 |